United States Patent
Nabekura et al.

(10) Patent No.: US 12,113,345 B2
(45) Date of Patent: Oct. 8, 2024

(54) GAS INSULATED BUS (71) Applicant: Mitsubishi Electric Corporation, Tokyo (JP)

(72) Inventors: Kohei Nabekura, Tokyo (JP); Shinichiro Nakauchi, Tokyo (JP); Daisuke Fujita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 341 days.

(21) Appl. No.: 17/429,069

(22) PCT Filed: Apr. 25, 2019

(86) PCT No.: PCT/JP2019/017683
§ 371 (c)(1),
(2) Date: Aug. 6, 2021

(87) PCT Pub. No.: WO2020/217392
PCT Pub. Date: Oct. 29, 2020

(65) Prior Publication Data
US 2022/0021193 A1     Jan. 20, 2022

(51) Int. Cl.
*H01B 9/04* (2006.01)
*H02G 5/06* (2006.01)

(52) U.S. Cl.
CPC .................. *H02G 5/063* (2013.01)

(58) Field of Classification Search
CPC .................. H01B 9/04; H01B 9/06
(Continued)

(56) References Cited

U.S. PATENT DOCUMENTS 3,652,778 A * 3/1972 Sakai ............ H02G 5/068
174/99 B
3,819,845 A * 6/1974 Tahiliani ............ H01B 17/26
174/12 R (Continued)

FOREIGN PATENT DOCUMENTS

JP    S58009027 U    7/1981
JP    6477411 A      3/1989
(Continued)

OTHER PUBLICATIONS

International Search Report (PCT/ISA/210) and Written Opinion (PCT/ISA/237) mailed on Jul. 16, 2019, by the Japan Patent Office as the International Searching Authority for International Application No. PCT/JP2019/017683.

*Primary Examiner* — Chau N Nguyen
(74) *Attorney, Agent, or Firm* — Buchanan Ingersoll & Rooney PC (57) ABSTRACT

A gas insulated bus includes: a first container including a first flange and forming a sealed space in which an insulating gas is enclosed; a second container including a second flange joined to the first flange and forming the sealed space together with the first container; a conductor housed in the sealed space; and an insulating support supporting the conductor in the sealed space. Part of the second flange is an inner flange including a mounting to which the insulating support is attached. The second container includes an extension portion in a portion in which the inner flange is provided, the extension portion extending toward a side opposite to a central axis of the conductor.

10 Claims, 10 Drawing Sheets

(58) Field of Classification Search
USPC .................................................. 174/24, 28
See application file for complete search history.

(56) References Cited

U.S. PATENT DOCUMENTS

| | | | | |
|---|---|---|---|---|
| 4,096,345 A | * | 6/1978 | Kemeny | ............... H02G 5/065 |
| | | | | 174/14 R |
| 4,280,015 A | * | 7/1981 | Czech | ............... H02B 13/045 |
| | | | | 174/121 R |
| 5,416,266 A | * | 5/1995 | Muller | ............... H02G 5/068 |
| | | | | 174/21 C |
| 2012/0103645 A1 | | 5/2012 | Shimizu et al. | |
| 2012/0281332 A1 | * | 11/2012 | Kato | ............... H02G 5/065 |
| | | | | 361/226 |

FOREIGN PATENT DOCUMENTS

| | | | |
|---|---|---|---|
| JP | 3466644 B2 | 11/2003 |
| JP | 2008228568 A | 9/2008 |
| JP | 4436896 B1 | 3/2010 |

* cited by examiner

GAS INSULATED BUS

FIELD

The present invention relates to a gas insulated bus that includes a container in which an insulating gas is enclosed and a conductor housed in the container.

BACKGROUND

Gas insulated buses used in power facilities such as power plants or substations are provided with insulating supports that support a conductor in the sealed space in which an insulating gas is enclosed.

Patent Literature 1 discloses a gas insulated bus which includes an internal shield, through which a conductor extends, and in which an insulating support is fixed to the internal shield at one end portion and is attached to a cylinder inner surface of a container at the other end portion. In the gas insulated bus in Patent Literature 1, the end portion of the insulating support to be attached to the container is fixed to the seat that projects from the cylinder inner surface toward the conductor.

CITATION LIST

Patent Literature

Patent Literature 1: Japanese Patent No. 4436896

SUMMARY

Technical Problem

In the conventional gas insulated buses in which the insulating support is attached to the cylinder inner surface as disclosed in Patent Literature 1, the diameter of the entire cylinder is determined according to the shape of the insulating support. The conventional gas insulated buses are formed such that the entire cylinder has an inner diameter that enables the insulating support to be disposed therein; therefore, there is a problem in that the container increases in size.

The present invention has been achieved in view of the above and an object of the present invention is to provide a gas insulated bus that enables miniaturization of a container.

Solution to Problem

In order to solve the above problems and achieve the object, a gas insulated bus according to an aspect of the present invention includes: a first container including a first flange and forming a sealed space in which an insulating gas is enclosed; a second container including a second flange joined to the first flange and forming the sealed space together with the first container; a conductor housed in the sealed space; and an insulating support supporting the conductor in the sealed space. Part of the second flange is an inner flange including a mounting to which the insulating support is attached. The second container includes an extension portion in a portion in which the inner flange is provided, the extension portion extending toward a side opposite to a central axis of the conductor.

Advantageous Effects of Invention

According to the present invention, an effect is obtained where a container of a gas insulated bus can be reduced in size.

DESCRIPTION OF EMBODIMENTS

A gas insulated bus according to embodiments of the present invention will be explained below in detail with reference to the drawings. This invention is not limited to the embodiments. In the drawings illustrated below, components in the cross-sectional views are not hatched in some cases in order to facilitate visualization of the drawings.

First Embodiment

Figure 1:
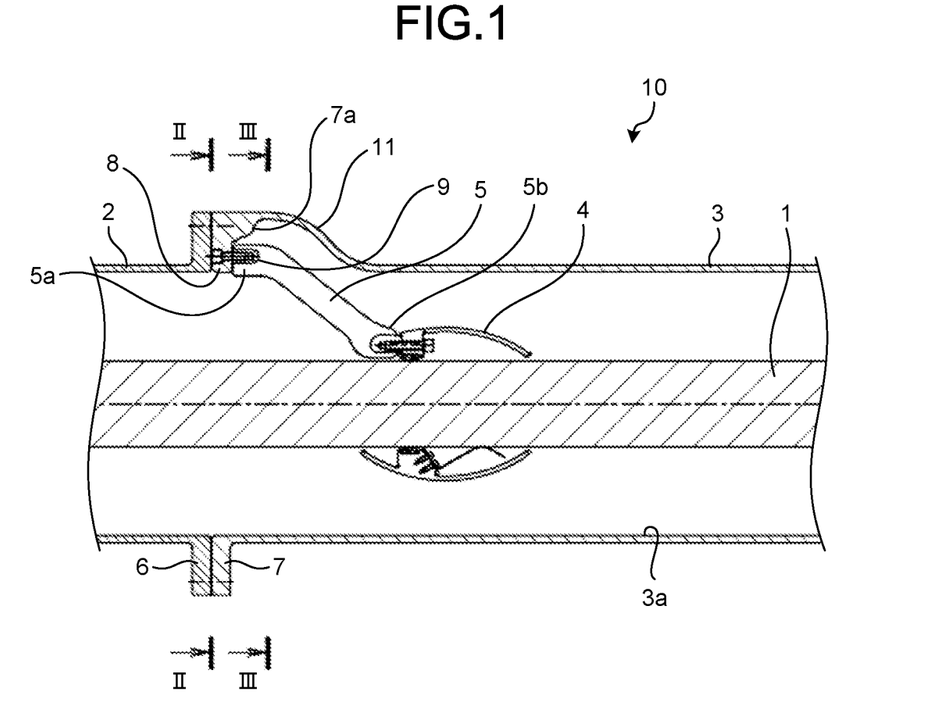
FIG. 1 is a cross-sectional view of a relevant part of a gas insulated bus according to a first embodiment of the present invention.
Figure 2:
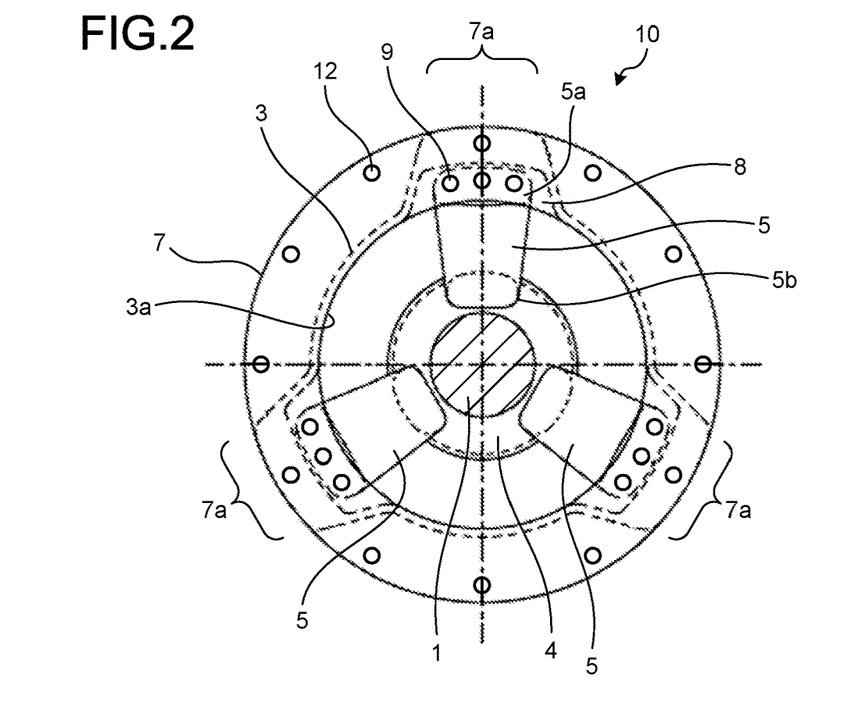
FIG. 2 is a cross-sectional view of the gas insulated bus taken along line II-II in FIG. 1.
Figure 3:
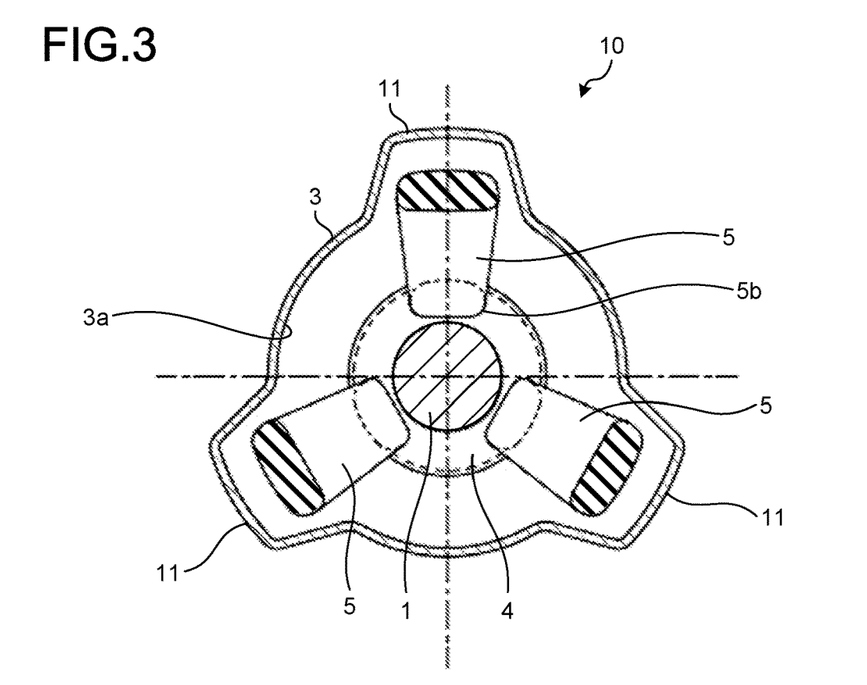
FIG. 3 is a cross-sectional view of the gas insulated bus taken along line III-III in FIG. 1.

FIG. 1 is a cross-sectional view of a relevant part of a gas insulated bus according to a first embodiment of the present invention. FIG. 2 is a cross-sectional view of the gas insulated bus taken along line II-II in FIG. 1. FIG. 3 is a cross-sectional view of the gas insulated bus taken along line III-III in FIG. 1.

A gas insulated bus 10 includes a conductor 1 and a plurality of containers coupled together. The containers form a sealed space in which an insulating gas is enclosed. One example of the insulating gas is sulfur hexafluoride ($SF_6$) gas. The conductor 1 is housed in the sealed space. FIG. 1 illustrates a longitudinal cross-section that is parallel to the vertical direction and includes a central axis of the conductor 1. In the following descriptions, the central axis of the conductor 1 is in some cases simply referred to as "central axis".

FIG. 1 illustrates, among the plurality of containers, two containers 2 and 3 that are coupled together. The container 2 and the container 3 are disposed coaxially with each other. The conductor 1 is disposed to extend through the center of the container 2 and the container 3. The container 2 is a first container and includes a first flange 6. The first flange 6 is provided at one end of the container 2 in the direction of the central axis. The container 3 is a second container and includes a second flange 7 joined to the first flange 6. The second flange 7 is provided at one end of the container 3 in the direction of the central axis. The entire first flange 6 forms an outer flange. Part of the second flange 7 forms inner flanges 7a. Part of the second flange 7 other than the inner flanges 7a forms an outer flange. FIG. 2 illustrates a cross-section that passes between the first flange 6 and the second flange 7 and is perpendicular to the central axis.

The gas insulated bus 10 includes a metal internal shield 4 disposed in the container 3 and insulating supports 5 attached inside the container 3. The internal shield 4 reduces the electric field concentration, i.e., field crowding. The conductor 1 extends through the internal shield 4. The outer surface of the internal shield 4 has a barrel shape that is rotationally symmetric about the central axis.

As illustrated in FIG. 1, the insulating supports 5 each have an elongated shape with a bent. The inner flanges 7a each include a mounting 8 to which the insulating support 5 is attached. A first end portion 5a of the insulating support 5 is fixed to the mounting 8. Filler metals 9 are embedded within the first end portion 5a of the insulating support 5. The mountings 8 each have screw holes through which screws are passed. The screws passed through the screw holes are tightened into the filler metals 9, so that the first end portion 5a is fixed to the mounting 8. The filler metals 9 and the screws are components for fixing the insulating support 5 to the mounting 8.

The internal shield 4 is fixed to second end portions 5b of the insulating supports 5. Filler metals are embedded within the second end portions 5b of the insulating supports 5 in a similar manner to the first end portions 5a. The internal shield 4 is provided with mountings for attachment to the insulating supports 5. The screws passed through the mountings of the internal shield 4 are tightened into the filler metals, so that the internal shield 4 is fixed to the second end portions 5b. The insulating supports 5 are each bent from a portion of the mounting 8 to which the first end portion 5a is fixed toward a portion of the internal shield 4 to which the second end portion 5b is fixed.

Screw holes 12 are formed in the outer flange and the inner flanges 7a of the second flange 7. Screw holes are formed in the first flange 6 at the positions corresponding to the screw holes 12. Nuts are tightened onto the bolts passed through the screw holes 12 of the second flange 7 and the screw holes of the first flange 6, whereby the first flange 6 and the second flange 7 are joined together.

The container 3 is provided with extension portions 11 extending outwardly, i.e., toward a side opposite to the conductor 1, in the portions in which the inner flanges 7a are provided. The portion of the container 3 other than the extension portions 11 forms a cylindrical shape. As illustrated in FIG. 1, the internal shield 4 is disposed in the cylindrical portion of the container 3. In other words, the internal shield 4 is disposed in the portion of the container 3 other than the extension portions 11 in the direction of the central axis. The extension portions 11 are formed between the inner flanges 7a and the cylindrical portion in which the internal shield 4 is provided, in the container 3. The first end portions 5a of the insulating supports 5 extend into the extension portions 11. The extension portions 11 are portions formed by expanding the inner diameter of the container 3 in accordance with the space in which the insulating supports 5 are disposed. The inner diameter at the extension portions 11 is determined according to the shape of the insulating supports 5. FIG. 3 illustrates a cross-section of the extension portions 11 and the insulating supports 5, perpendicular to the central axis.

A cylinder inner surface 3a is an inner surface in the portion of the container 3 other than the portions in which the extension portions 11 are provided and in the portion of the container 3 in which the internal shield 4 is provided. The container 3 has a smaller inner diameter at the cylinder inner surface 3a than at the extension portions 11. The container 2 has an inner diameter equal to the inner diameter of the container 3 at the cylinder inner surface 3a. Thus, the inner diameter of the container 2 and the inner diameter of the cylindrical portion of the container 3 are smaller than the inner diameter at the extension portions 11.

As illustrated in FIG. 2 and FIG. 3, three insulating supports 5 are provided in the container 3. The three insulating supports 5 are equally spaced in the circumferential direction of a circle about the central axis. The three insulating supports 5 are disposed to be oriented in different directions from each other by 120 degrees. The three insulating supports 5 are equally spaced; therefore, the gas insulated bus 10 can achieve a balanced distribution of the mechanical strength for supporting the conductor 1 and thus can stably support the conductor 1.

One of the three mountings 8 is provided vertically above the conductor 1. The insulating support 5 provided corresponding to this mounting 8 is disposed vertically above the conductor 1. The other two of the three mountings 8 are provided at positions vertically below the conductor 1, i.e., positions other than the bottom portion in the container 3. The insulating supports 5 provided corresponding to the two of the three mountings 8 are disposed at positions other than the bottom portion in the container 3. In the container 3, the extension portions 11 are provided respectively in the portions in which three inner flanges 7a are provided.

In the structure formed by coupling a plurality of containers, sets of the three insulating supports 5 are provided at regular intervals in the direction of the central axis. Each of the insulating supports 5 disposed in such a structure supports the conductor 1 in the sealed space. Each of the insulating supports 5 is attached to the mounting 8 of the inner flange 7a in a similar manner to the insulating supports 5 illustrated in FIG. 1 to FIG. 3.

The container 3 is provided with the extension portions 11, so that the portion of the containers 2 and 3 other than the portion in which the insulating supports 5 are disposed has a cylindrical shape with an inner diameter smaller than that at the extension portions 11. Thus, the containers 2 and 3 can be reduced in size as compared with the case where the containers 2 and 3 together form a cylindrical shape as a whole with an inner diameter that is determined according to the shape of the insulating supports 5. A reduction in size of the containers 2 and 3 leads to a reduction in the amount of material required to manufacture the containers 2 and 3. Consequently, the containers 2 and 3 can be reduced in weight. Moreover, a reduction in the amount of material required to manufacture the containers 2 and 3 can lead to a reduction in material cost for manufacturing the containers 2 and 3.

The mountings 8 and the first end portions 5a are disposed in the portions extended into the extension portions 11 in the sealed space. Since the inner diameter at the extension portions 11 is larger than the inner diameter at the cylinder inner surface 3a of the container 3, the first end portions 5a are fixed to the mountings 8 at positions outside the cylinder inner surface 3a. In other words, the areas of the insulating supports 5 fixed to the mountings 8 are located on the opposite side of the cylinder inner surface 3a from the central axis. Thus, the gas insulated bus 10 can reduce the electric field concentration in the sealed space as compared to the case where the areas of the insulating supports 5 fixed to the container 3 are projected toward the central axis relative to the cylinder inner surface 3a. Moreover, since the gas insulated bus 10 can eliminate a projecting portion projecting beyond the cylinder inner surface 3a, it is not necessary to provide a shield for reducing the electric field concentration at the projecting portion. Elimination of the need to provide the shield in the gas insulated bus 10 can result in a reduction in the number of components. It is sufficient if at least part of the areas of the insulating supports 5 fixed to the mountings 8 in the gas insulated bus 10 is located on the opposite side of the cylinder inner surface 3a from the central axis. With this configuration, the gas insulated bus 10 can reduce the electric field concentration.

The first end portions 5a are attached to the mountings 8 before the second flange 7 is joined to the first flange 6. The second flange 7 with the first end portions 5a being attached to the mountings 8 is joined to the first flange 6. The second flange 7 is joined to the first flange 6, whereby the filler metals 9 and the screws that are components for fixing the first end portions 5a to the mountings 8 are embedded within the integrated structures of the first flange 6, the mountings 8, and the first end portions 5a. The first flange 6 and the mountings 8 are integrated by joining together the first flange 6 and the second flange 7. The mounting 8 and the first end portion 5a are integrated by fixing the first end portion 5a to the mounting 8.

The components for fixing the first end portions 5a to the mountings 8 are embedded within the integrated structures of the first flange 6, the mountings 8, and the first end portions 5a; therefore, the gas insulated bus 10 can dispose the components for fixing the insulating supports 5 in the container 3 without exposing them in the sealed space. The components for fixing the insulating supports 5 are not exposed; therefore, the gas insulated bus 10 can reduce the electric field concentration in the sealed space. Moreover, it is not necessary for the gas insulated bus 10 to provide a shield for reducing the electric field concentration at the components for fixing the insulating supports 5. Elimination of the need to provide the shield in the gas insulated bus 10 can result in a reduction in the number of components.

When metal foreign objects enter the container 3, the metal foreign objects remain in the bottom portion formed of the cylinder inner surface 3a. Moreover, the metal foreign objects repeatedly rise up from the bottom portion and move within the bottom portion in some cases due to the influence of the electric field generated when voltage is applied to the conductor 1. Each of the insulating supports 5 is disposed at a position other than the bottom portion in the container 3; therefore, the metal foreign objects can be prevented from adhering to the insulating supports 5. The gas insulated bus 10 can eliminate an insulator projecting beyond the cylinder inner surface 3a in the bottom portion; therefore, it is not necessary to provide a shield for reducing the electric field concentration in the bottom portion. Elimination of the need to provide the shield in the gas insulated bus 10 can result in a reduction in the number of components.

As illustrated in FIG. 3, the insulating supports 5 each have a flat shape in cross-section in the radial direction. The insulating supports 5 having a flat shape can reduce the space required to dispose the insulating supports 5 in the radial direction. Consequently, the container 3 of the gas insulated bus 10 can be reduced in size. Moreover, the insulating supports 5 each have a cross-sectional shape that is wide in the direction perpendicular to the radial direction; therefore, the insulating supports 5 can firmly support the conductor 1.

According to the first embodiment, the container 3 of the gas insulated bus 10 includes the inner flanges 7a including the mountings 8 and the extension portions 11, so that the inner diameter of the portion of the containers 2 and 3 other than the portion in which the extension portions 11 are provided can be reduced. Therefore, the gas insulated bus 10 produces an effect where the containers 2 and 3 can be reduced in size.

Second Embodiment

Figure 4:
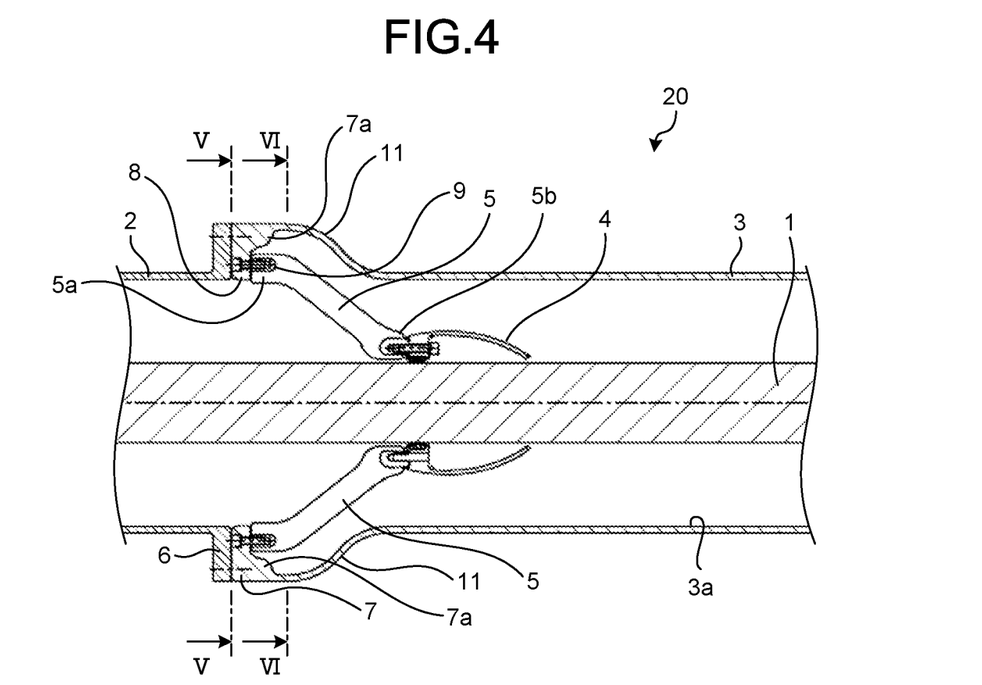
FIG. 4 is a cross-sectional view of a relevant part of a gas insulated bus according to a second embodiment of the present invention.
Figure 5:
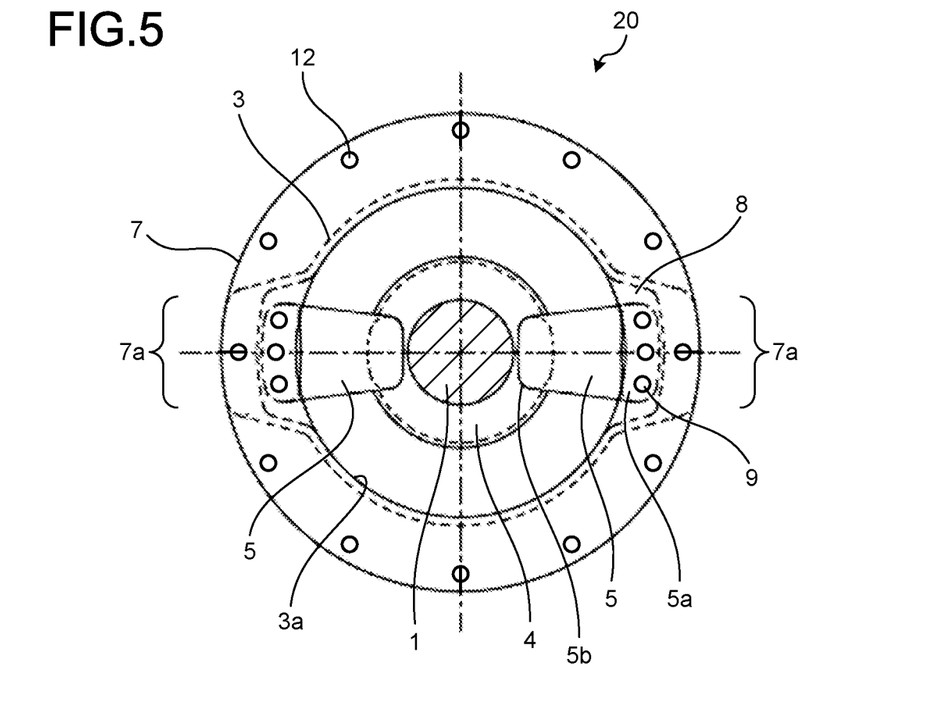
FIG. 5 is a cross-sectional view of the gas insulated bus taken along line V-V in FIG. 4.
Figure 6:
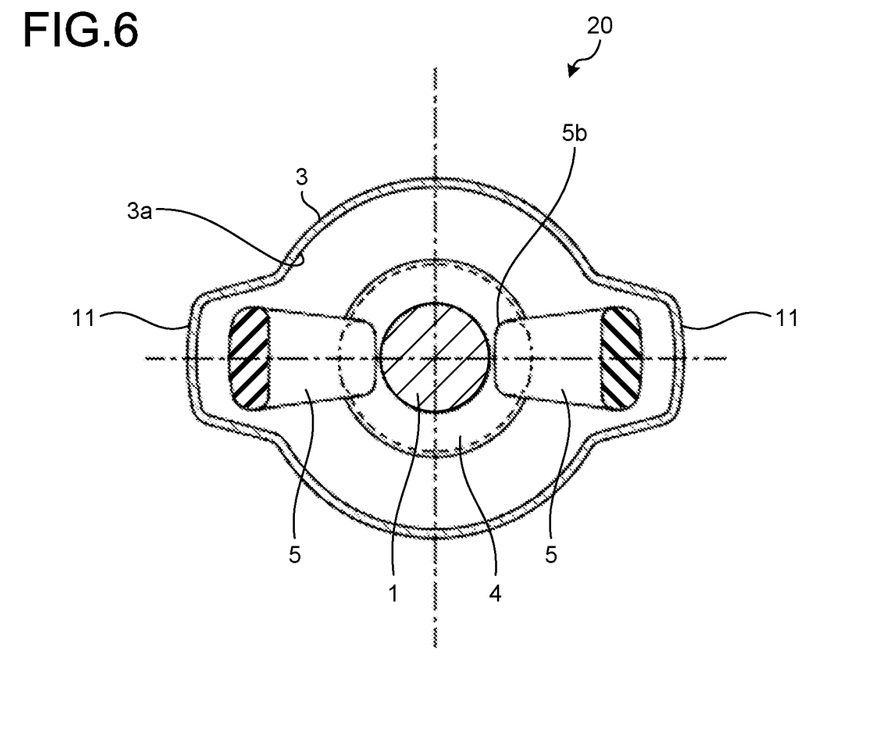
FIG. 6 is a cross-sectional view of the gas insulated bus taken along line VI-VI in FIG. 4.

FIG. 4 is a cross-sectional view of a relevant part of a gas insulated bus according to a second embodiment of the present invention. FIG. 5 is a cross-sectional view of the gas insulated bus taken along line V-V in FIG. 4. FIG. 6 is a cross-sectional view of the gas insulated bus taken along line VI-VI in FIG. 4. In a gas insulated bus 20 according to the second embodiment, two insulating supports 5 are provided in the container 3. In the second embodiment, the same components as those in the above first embodiment are denoted by the same reference numerals as those assigned to such components in the first embodiment, and a configuration different from that in the first embodiment will be mainly described. FIG. 4 illustrates a transverse cross-section that is perpendicular to the vertical direction and includes the central axis of the conductor 1. FIG. 5 illustrates a cross-section that passes between the first flange 6 and the second flange 7 and is perpendicular to the central axis. FIG. 6 illustrates a cross-section of the extension portions 11 and the insulating supports 5, perpendicular to the central axis.

As illustrated in FIG. 5 and FIG. 6, the two insulating supports 5 are disposed to be oriented in different directions from each other by 180 degrees. Two mountings 8 are disposed at positions lateral to the conductor 1. The insulating supports 5 are disposed at positions lateral to the conductor 1. In the second embodiment as well, the insulating supports 5 are provided at positions other than the bottom portion in the container 3. In the container 3, the extension portions 11 are provided respectively in the portions in which two inner flanges 7a are provided.

The gas insulated bus 20 can eliminate an insulator projecting beyond the cylinder inner surface 3a in the bottom portion; therefore, it is not necessary to provide a shield for reducing the electric field concentration. Elimination of the need to provide the shield in the gas insulated bus 20 can result in a reduction in the number of components. It is sufficient for the two insulating supports 5 to be disposed at positions other than the bottom portion in the container 3, and the two insulating supports 5 may be disposed at positions other than the positions lateral to the conductor 1. The two insulating supports 5 may be disposed to be oriented in different directions from each other by an angle other than 180 degrees.

According to the second embodiment, the containers 2 and 3 of the gas insulated bus 20 can be reduced in size in a similar manner to the first embodiment. Moreover, the gas insulated bus 20 includes a smaller number of the insulating supports 5 than those in the case of the first embodiment; therefore, the number of components can be reduced in the gas insulated bus 20. In the gas insulated bus 20, the number of components is reduced; therefore, the manufacturing cost can be reduced. The gas insulated bus 10 according to the first embodiment includes a larger number of the insulating supports 5 than those in the gas insulated bus 20 according to the second embodiment; therefore, the gas insulated bus 10 can support the conductor 1 more firmly than in the case of the second embodiment.

Third Embodiment

Figure 7:
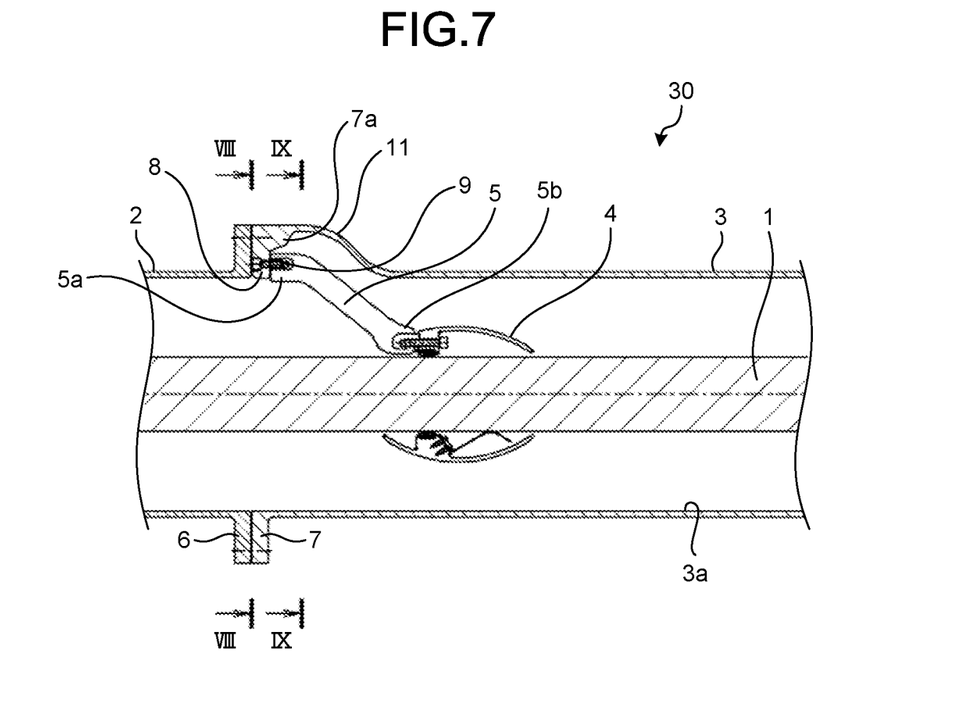
FIG. 7 is a cross-sectional view of a relevant part of a gas insulated bus according to a third embodiment of the present invention.
Figure 8:
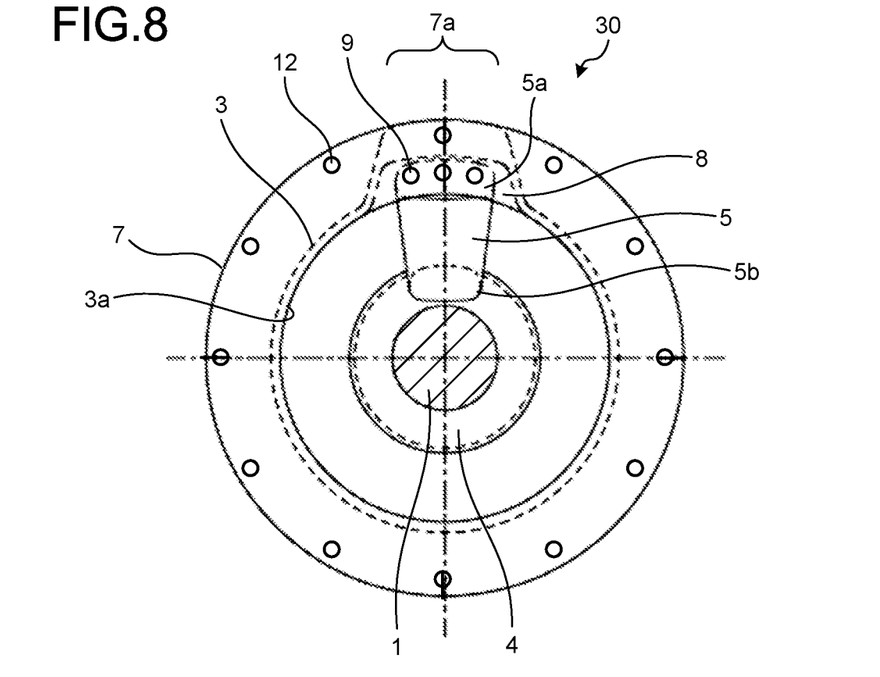
FIG. 8 is a cross-sectional view of the gas insulated bus taken along line VIII-VIII in FIG. 7.
Figure 9:
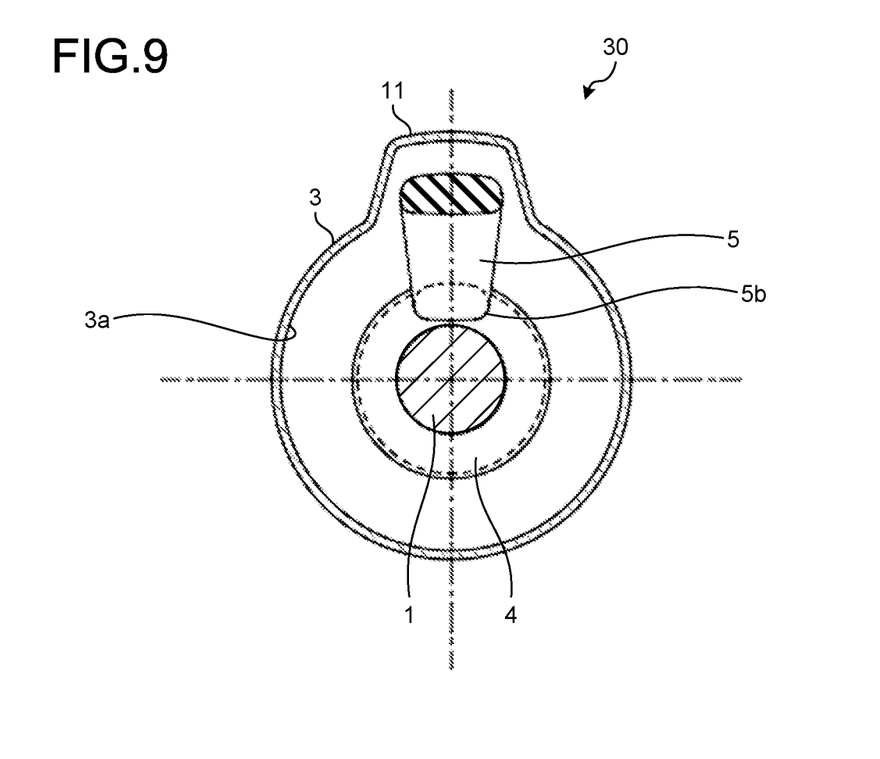
FIG. 9 is a cross-sectional view of the gas insulated bus taken along line IX-IX in FIG. 7.

FIG. 7 is a cross-sectional view of a relevant part of a gas insulated bus according to a third embodiment of the present invention. FIG. 8 is a cross-sectional view of the gas insulated bus taken along line VIII-VIII in FIG. 7. FIG. 9 is a cross-sectional view of the gas insulated bus taken along line IX-IX in FIG. 7. In a gas insulated bus 30 according to the third embodiment, one insulating support 5 is provided in the container 3. In the third embodiment, the same components as those in the above first and second embodiments are denoted by the same reference numerals as those assigned to such components in the first and second embodiments, and a configuration different from those in the first and second embodiments will be mainly described. FIG. 7 illustrates a longitudinal cross-section that is parallel to the vertical direction and includes the central axis of the conductor 1. FIG. 8 illustrates a cross-section that passes between the first flange 6 and the second flange 7 and is perpendicular to the central axis. FIG. 9 illustrates a cross-section of the extension portion 11 and the insulating support 5, perpendicular to the central axis.

The mounting 8 is provided vertically above the conductor 1. The insulating support 5 is disposed vertically above the conductor 1. In the third embodiment as well, the insulating support 5 is provided at a position other than the bottom portion in the container 3. In the container 3, the extension portion 11 is provided in the portion in which the inner flange 7a is provided. The gas insulated bus 30 can eliminate an insulator projecting beyond the cylinder inner surface 3a in the bottom portion; therefore, it is not necessary to provide a shield for reducing the electric field concentration. Elimination of the need to provide the shield in the gas insulated bus 30 can result in a reduction in the number of components.

According to the third embodiment, the containers 2 and 3 of the gas insulated bus 30 can be reduced in size in a similar manner to the first and second embodiments. Moreover, the gas insulated bus 30 includes a smaller number of the insulating supports 5 than those in the case of the first and second embodiments; therefore, the number of components can be reduced in the gas insulated bus 30. In the gas insulated bus 30, the number of components is reduced; therefore, the manufacturing cost can be reduced. The gas insulated buses 10 and 20 according to the first and second embodiments each include a larger number of the insulating supports 5 than in the gas insulated bus 30 according to the third embodiment; therefore, the gas insulated buses 10 and 20 can support the conductor 1 more firmly than in the case of the third embodiment.

Fourth Embodiment

Figure 10:
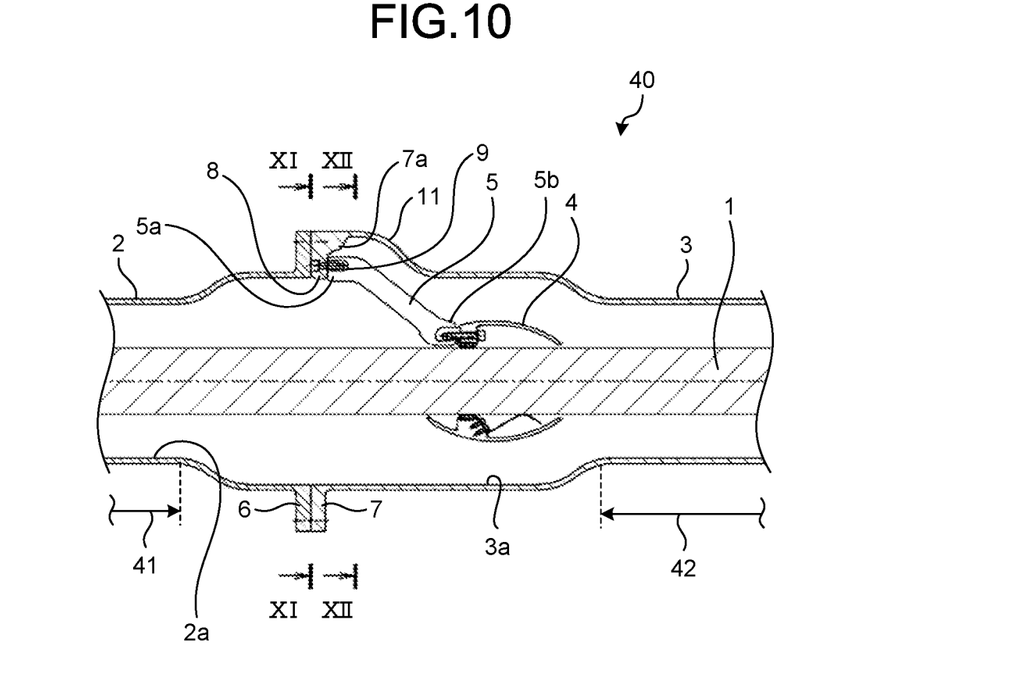
FIG. 10 is a cross-sectional view of a relevant part of a gas insulated bus according to a fourth embodiment of the present invention.
Figure 11:
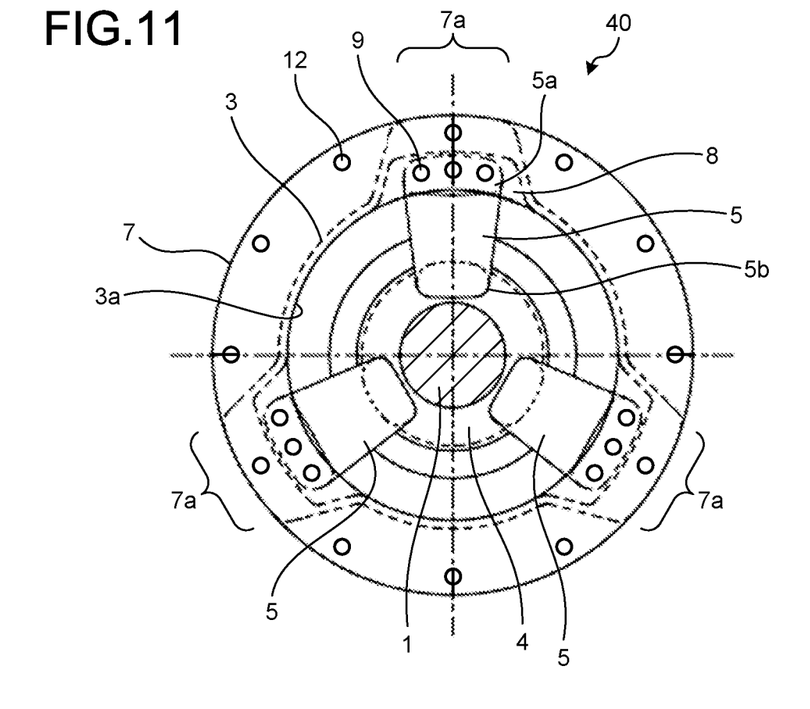
FIG. 11 is a cross-sectional view of the gas insulated bus taken along line XI-XI in FIG. 10.
Figure 12:
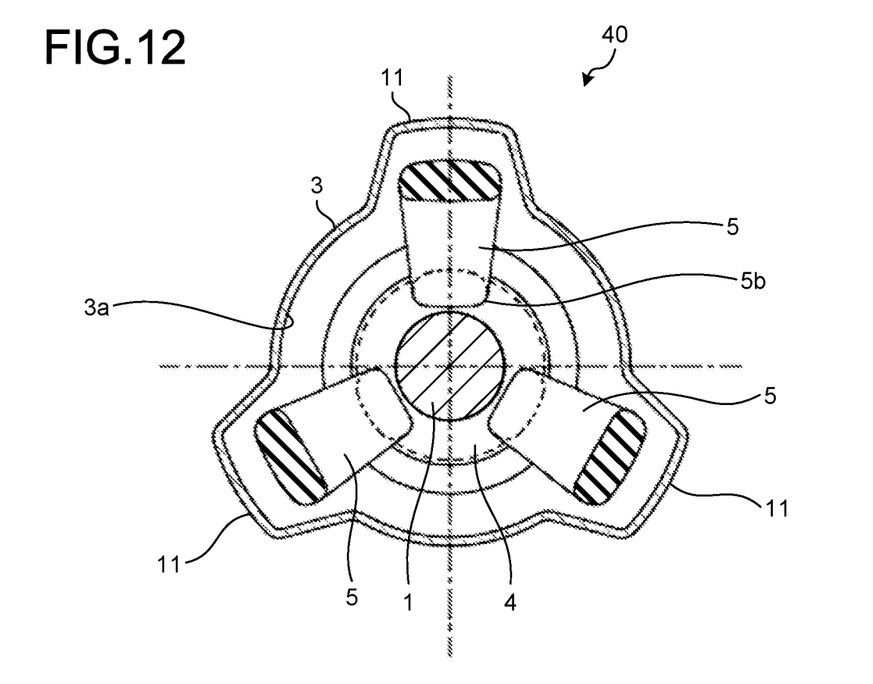
FIG. 12 is a cross-sectional view of the gas insulated bus taken along line XII-XII in FIG. 10.

FIG. 10 is a cross-sectional view of a relevant part of a gas insulated bus according to a fourth embodiment of the present invention. FIG. 11 is a cross-sectional view of the gas insulated bus taken along line XI-XI in FIG. 10. FIG. 12 is a cross-sectional view of the gas insulated bus taken along line XII-XII in FIG. 10. In a gas insulated bus 40 according to the fourth embodiment, the container 2 and the container 3 include cylindrical portions 41 and 42 having an inner diameter smaller than that of the cylindrical portion in which the internal shield 4 is provided. In the fourth embodiment, the same components as those in the above first to third embodiments are denoted by the same reference numerals as those assigned to such components in the first to third embodiments, and a configuration different from those in the first to third embodiments will be mainly described. FIG. 10 illustrates a longitudinal cross-section that is parallel to the vertical direction and includes the central axis of the conductor 1. FIG. 11 illustrates a cross-section that passes between the first flange 6 and the second flange 7 and is perpendicular to the central axis. FIG. 12 illustrates a cross-section of the extension portions 11 and the insulating supports 5, perpendicular to the central axis.

In the container 3, the cylindrical portion 42 is provided on the opposite side of the cylindrical portion in which the internal shield 4 is provided, from the second flange 7. The conductor 1 is provided in the cylindrical portion 42. The cylindrical portion 42 is a portion having a minimum inner diameter in the container 3. The inner diameter is reduced in the cylindrical portion 42, so that the interval between the cylinder inner surface 3a and the conductor 1 in the cylindrical portion 42 is substantially equivalent to the interval between the cylinder inner surface 3a and the internal shield 4 in the cylindrical portion in which the internal shield 4 is provided. Consequently, the container 3 of the gas insulated bus 40 can be further reduced in size while insulation is maintained between the conductor 1 and the container 3.

The inner diameter of the portion of the container 2 in which the first flange 6 is provided is equal to the inner diameter of the cylindrical portion of the container 3 in which the internal shield 4 is provided. The cylindrical portion 41 is provided on the opposite side of the cylindrical portion having an inner diameter equal to the inner diameter of the cylindrical portion in which the internal shield 4 is provided, from the first flange 6. The conductor 1 is provided in the cylindrical portion 41. The cylindrical portion 41 is a portion having a minimum inner diameter in the container 2.

The inner diameter is reduced in the cylindrical portion 41, so that the interval between a cylinder inner surface 2a and the conductor 1 in the cylindrical portion 41 is substantially equivalent to the interval between the cylinder inner surface 3a and the internal shield 4 in the cylindrical portion in which the internal shield 4 is provided. Consequently, the container 2 of the gas insulated bus 40 can be further reduced in size while insulation is maintained between the conductor 1 and the container 2.

The cylindrical portion having an inner diameter equal to the inner diameter of the cylindrical portion in which the internal shield 4 is provided is provided between the first flange 6 and the cylindrical portion 41; therefore, an abrupt change in the inner diameter between the first flange 6 and the cylindrical portion 41 can be reduced in the container 2.

An abrupt change in the inner diameter in the container 2 is reduced; therefore, the gas insulated bus 40 can reduce the electric field concentration. The number of the insulating supports 5 provided in the container 3 is not limited to three and can be two or one.

According to the fourth embodiment, the containers 2 and 3 of the gas insulated bus 40 can be reduced in size in a similar manner to the first embodiment. Further, the container 2 and the container 3 of the gas insulated bus 40 include the cylindrical portions 41 and 42 having an inner diameter smaller than that of the portion in which the internal shield 4 is provided. Consequently, the containers 2 and 3 of the gas insulated bus 40 can be further reduced in size while insulation is maintained between the conductor 1 and the containers 2 and 3.

Fifth Embodiment

Figure 13:
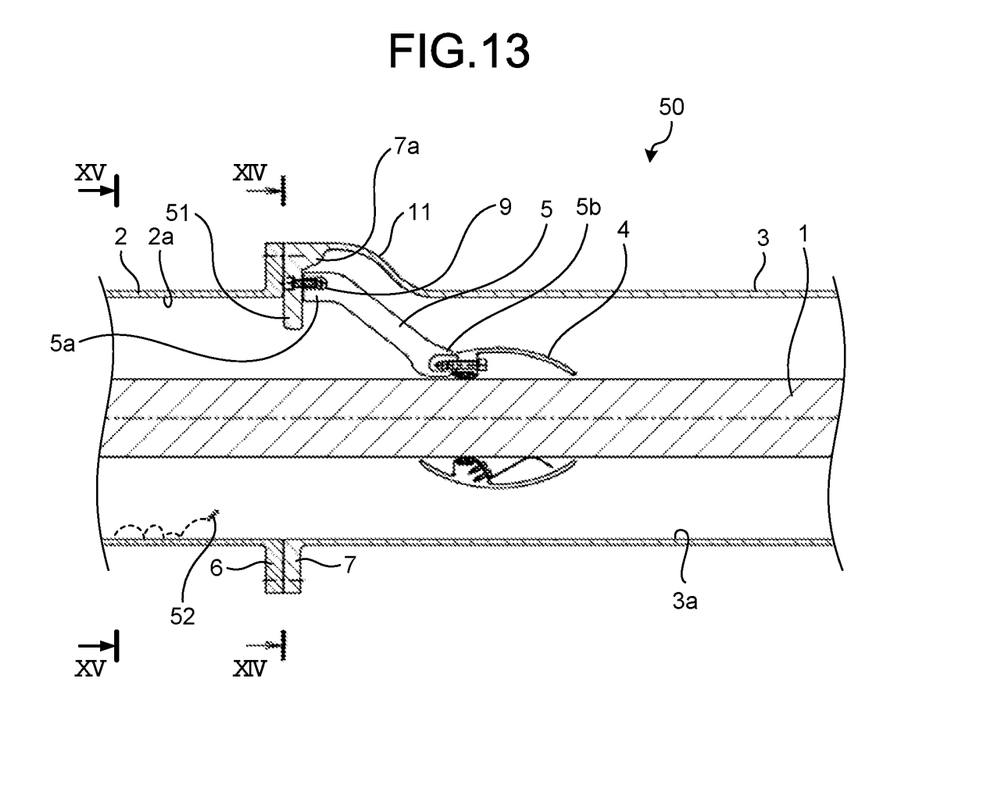
FIG. 13 is a cross-sectional view of a relevant part of a gas insulated bus according to a fifth embodiment of the present invention.
Figure 14:
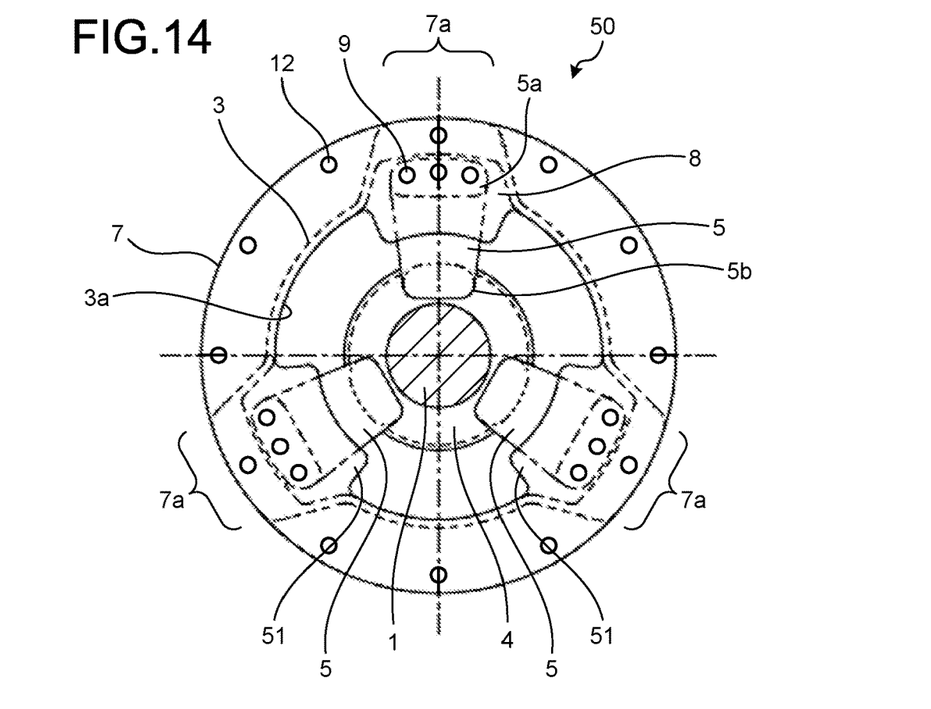
FIG. 14 is a cross-sectional view of the gas insulated bus taken along line XIV-XIV in FIG. 13.
Figure 15:
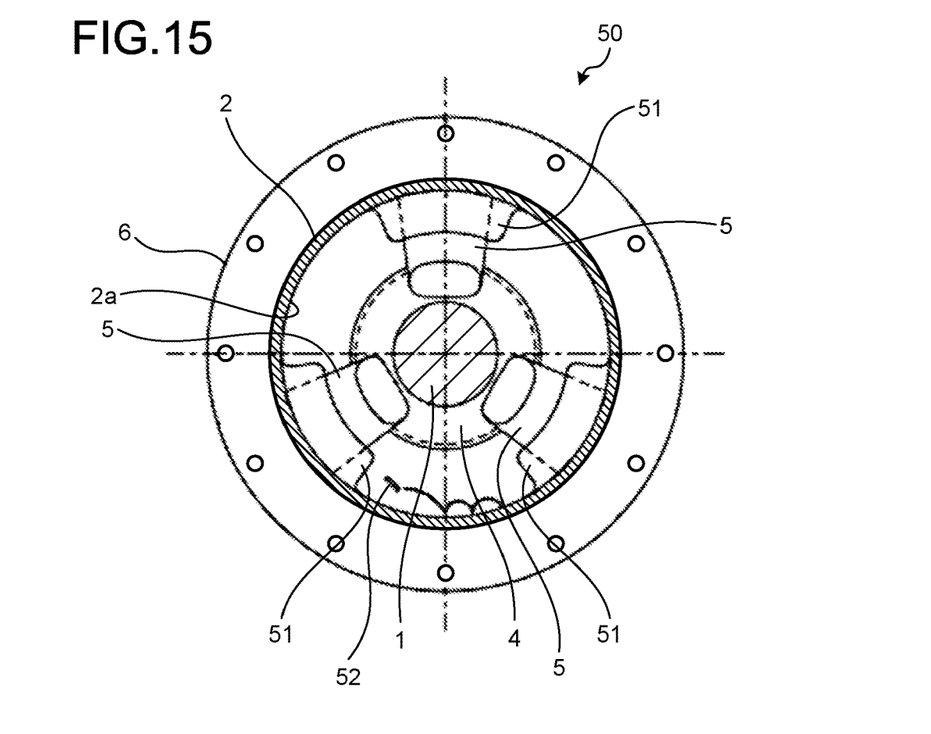
FIG. 15 is a cross-sectional view of the gas insulated bus taken along line XV-XV in FIG. 13.

FIG. 13 is a cross-sectional view of a relevant part of a gas insulated bus according to a fifth embodiment of the present invention. FIG. 14 is a cross-sectional view of the gas insulated bus taken along line XIV-XIV in FIG. 13. FIG. 15 is a cross-sectional view of the gas insulated bus taken along line XV-XV in FIG. 13. Mountings 51 provided in a gas insulated bus 50 according to the fifth embodiment project toward the conductor 1 relative to the cylinder inner surface 3a in a portion of the container 3 other than the extension portions 11. In the fifth embodiment, the same components as those in the above first to fourth embodiments are denoted by the same reference numerals as those assigned to such components in the first to fourth embodiments, and a configuration different from those in the first to fourth embodiments will be mainly described. FIG. 13 illustrates a longitudinal cross-section that is parallel to the vertical direction and includes the central axis of the conductor 1. FIG. 14 illustrates a cross-section that passes between the first flange 6 and the second flange 7 and is perpendicular to the central axis. FIG. 15 illustrates a cross-section of the container 2 perpendicular to the central axis.

As illustrated in FIG. 13 and FIG. 15, when a metal foreign object 52 enters the container 2, the metal foreign object 52 remains in the bottom portion formed of the cylinder inner surface 2a of the container 2. The metal foreign object 52 repeatedly rises up from the bottom portion and moves within the bottom portion in some cases due to the influence of the electric field generated when voltage is applied to the conductor 1. When the metal foreign object 52 moves from the container 2 toward the container 3, the movement of the metal foreign object 52 is blocked by the mountings 51. In such a manner, the gas insulated bus 50 includes the mountings 51 projecting toward the conductor 1 relative to the cylinder inner surface 3a; therefore, the metal foreign object 52 can be prevented from adhering to the insulating supports 5. The number of the insulating supports 5 provided in the container 3 is not limited to three and can be two or one. Moreover, the containers 2 and 3 may include the cylindrical portions 41 and 42 having an inner diameter smaller than that of the cylindrical portion in which the internal shield 4 is provided in a similar manner to the fourth embodiment.

According to the fifth embodiment, the containers 2 and 3 of the gas insulated bus 50 can be reduced in size in a similar manner to the first embodiment. Further, the gas insulated bus 50 includes the mountings 51 projecting toward the conductor 1 relative to the cylinder inner surface 3a; therefore, the metal foreign object 52 can be prevented from adhering to the insulating supports 5.

The configurations described in the above embodiments are only examples of an aspect of the present invention. The configurations can be combined with other well-known techniques, and part of each of the configurations can be omitted or modified without departing from the scope of the present invention.

REFERENCE SIGNS LIST 1 conductor; 2, 3 container; 2a, 3a cylinder inner surface; 4 internal shield; 5 insulating support; 5a first end portion; 5b second end portion; 6 first flange; 7 second flange; 7a inner flange; 8, 51 mounting; 9 filler metal; 10, 20, 30, 40, 50 gas insulated bus; 11 extension portion; 12 screw hole; 41, cylindrical portion; 52 metal foreign object.

The invention claimed is:

1. A gas insulated bus comprising:
a first container including a first flange and forming a sealed space in which an insulating gas is enclosed;
a second container including a second flange joined to the first flange and forming the sealed space together with the first container;
a conductor housed in the sealed space; and
an insulating support supporting the conductor in the sealed space, wherein
the entire first flange forms an outer flange,
the second flange has a first part forming an inner flange, and a second part other than the first part, the second part forming an outer flange, the first part forming the inner flange extending around only a portion of the inner circumference of the second container,
the inner flange includes a mounting to which an end portion of the insulating support is attached,
the second container includes an extension portion in a portion in which the inner flange is provided, the extension portion extending toward a side opposite to a central axis of the conductor, and
at least part of the end portion of the insulating support attached to the mounting extends into the extension portion.

2. The gas insulated bus according to claim 1, comprising an internal shield through which the conductor extends, the internal shield being fixed to the insulating support, wherein
the internal shield is disposed in a portion of the second container other than the extension portion in a direction of the central axis, and
the first container and the second container include a portion having an inner diameter smaller than an inner diameter of a portion in which the internal shield is provided.

3. The gas insulated bus according to claim 1, wherein the mounting projects toward the central axis so as to be located radially inward more than an inner surface of a portion of the second container other than the extension portion.

4. The gas insulated bus according to claim 1, wherein the insulating support has a flat shape in cross-section in a radial direction of the second container.

5. The gas insulated bus according to claim 1, wherein at the end portion of the insulating support extending into the extension portion has an area that is located radially outside of an inner surface of a portion of the second container other than the extension portion.

6. The gas insulated bus according to claim 1, wherein a component for fixing the insulating support to the mounting is embedded within an integrated structure of the first flange, the mounting, and the insulating support.

7. The gas insulated bus according to claim 1, wherein the insulating support is disposed at a position other than a bottom portion in the second container.

8. The gas insulated bus according to claim 1, wherein
the insulating support is three in number,
the three insulating supports are provided in the second container, and
the three insulating supports are equally spaced.

9. The gas insulated bus according to claim 1, wherein
the insulating support is two in number, and
the two insulating supports are provided in the second container.

10. The gas insulated bus according to claim 1, wherein
the insulating support is one in number, and
the one insulating support is provided in the second container.

* * * * *